May 14, 1946.  W. J. MULLIGAN  2,400,162
INTERLOCKING SPLINE DEVICE FOR STRUCTURAL UNITS
Filed Jan. 18, 1943  2 Sheets-Sheet 2
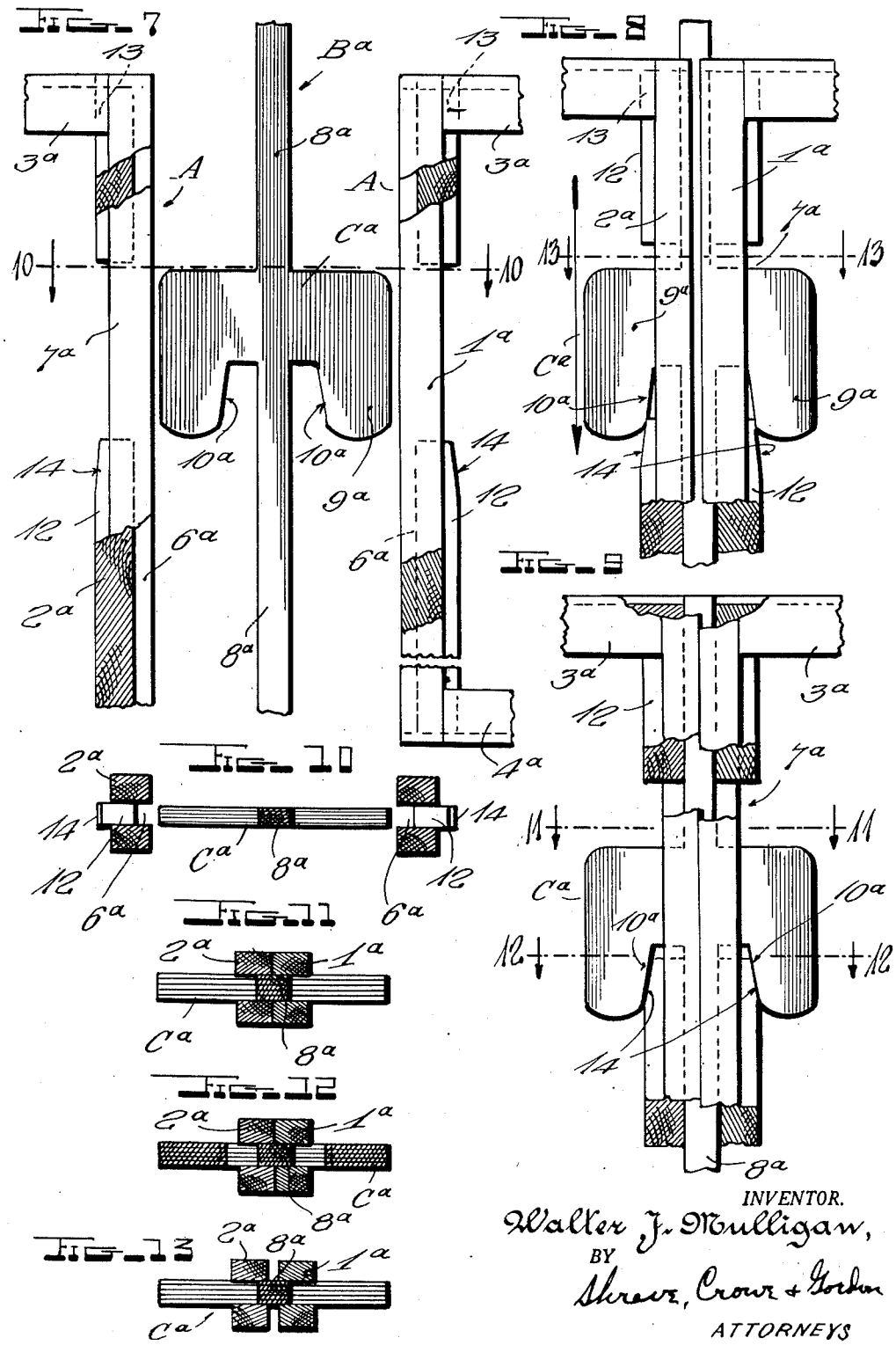
INVENTOR.
Walter J. Mulligan,
BY
Shreve, Crowe & Gordon
ATTORNEYS Patented May 14, 1946

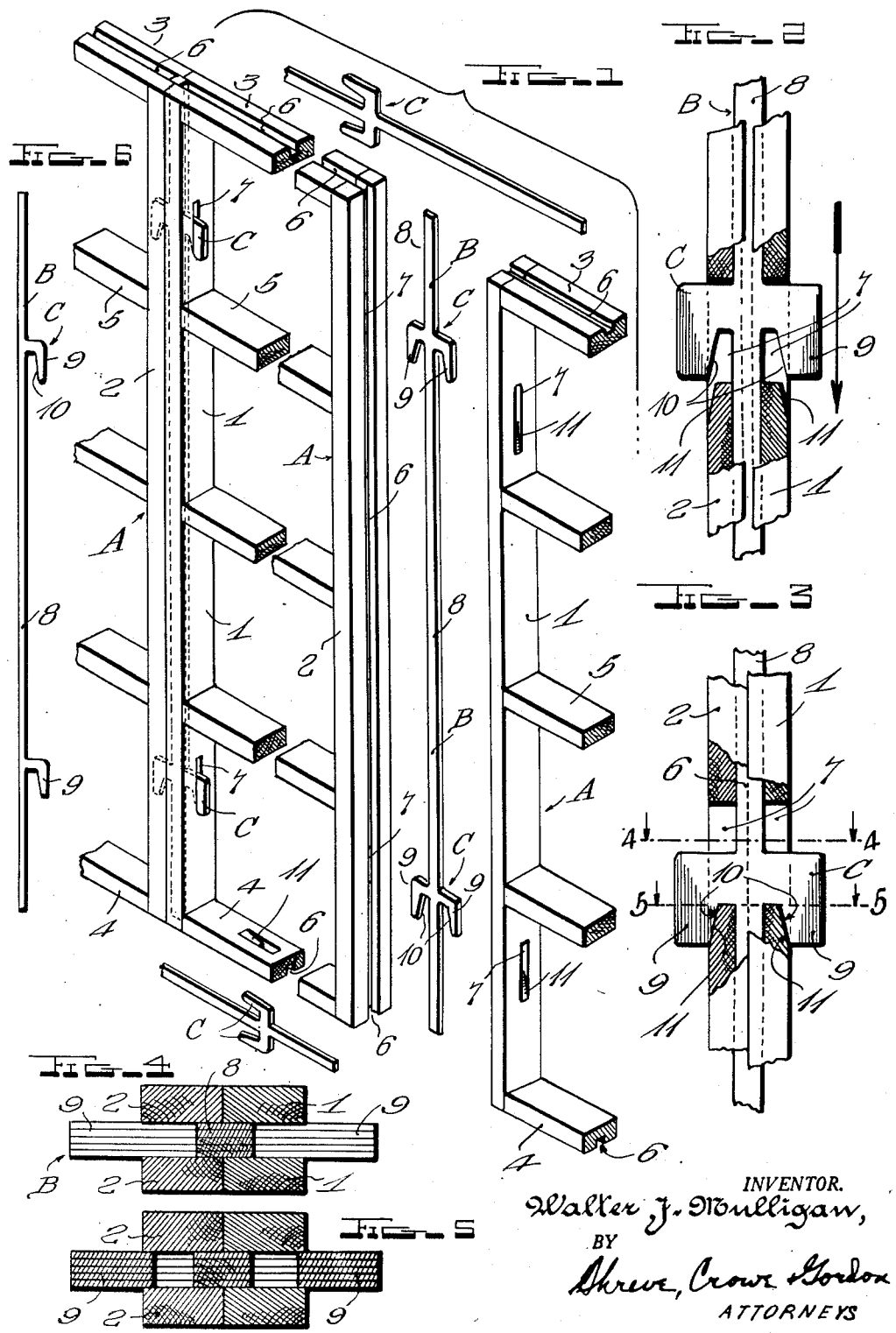

2,400,162

UNITED STATES PATENT OFFICE 2,400,162

INTERLOCKING SPLINE DEVICE FOR STRUCTURAL UNITS

Walter J. Mulligan, San Mateo, Calif.

Application January 18, 1943, Serial No. 472,772

8 Claims. (Cl. 20—92)

Generically this invention relates to an interconnecting or locking means, but it more particularly is directed to a spline device for expeditiously effecting, in a building construction, the positive locking together of adjacent structural units unto a rigid unitary structure.

One of the principal objects of this invention is the provision of a removable locking spline device for effecting a positive and rigid interlocking of adjacent structural units in either horizontal, vertical, or other assembled relation.

A further object of this invention is the provision of a removable spline device adapted to be embedded in the meeting faces of the contacting members of adjacent structural units and having beveled hook means engageable through and with the opposite surfaces of said contacting members to effect their binding engagement and to positively and rigidly lock said units together as a unitary structure.

A still further important object of this invention is the provision of a spline-tongue member embeddingly inserted within the contacting edges of the floor, wall, ceiling, and roof sections, and designed, when driven in tight, to align and draw said edges together and firmly hold and lock the interconnected sections in place.

Another object of this invention is the provision of an interconnecting locking means for quickly effecting the locking together of adjoining structural units, constituting with respect to exterior units a waterproof and weather stop, and admitting of removal with equal facility, thereby likewise insuring the ready and quick demounting of the sections.

With these and other objects in view, which will become apparent as the description proceeds, the invention resides in the construction, combination and arrangement of parts, hereinafter more fully described and claimed, and illustrated in the accompanying drawings, in which like characters of reference indicate like parts throughout the several figures, of which:

Fig. 1 is a perspective fragmentary view of the structural units and spline in assembled and disassembled relation.

Fig. 2 is an assembled fragmentary elevational view partly in section with the spline in position to be moved into binding and locking position.

Fig. 3 is a similar view to Fig. 2 with the spline in locking position.

Fig. 4 is a horizontal section on the line 4—4 of Fig. 3.

Fig. 5 is a horizontal section on the line 5—5 of Fig. 3.

Fig. 6 is a view in elevation of a single spline with locking elements only on one side.

Fig. 7 is a fragmentary view of a slightly modified form with the parts in disassembled relation showing the strengthening tongue or rib extending the length of the respective contacting rails and having beveled spline engaging portions.

Fig. 8 is an assembled fragmentary elevational view partly in section with the spline in position to be forced into binding and locking engagement with the rail tongues.

Fig. 9 is a similar view to Fig. 8 showing the spline in locking position.

Fig. 10 is a horizontal section on the line 10—10 of Fig. 7.

Fig. 11 is a horizontal section on the lines 11—11 of Fig. 9.

Fig. 12 is a horizontal section on the line 12—12 of Fig. 9.

Fig. 13 is a horizontal section on the line 13—13 of Fig. 8.

The present emergency has created in the building industry unprecedented demands as to material, and speed of production, and the shifting of workers in great numbers to vastly augmented and newly established industrial centers has created an acute housing situation, necessitating a stupendous increase in housing units and at the same time a conservation of critical materials. To accomplish this, a radical departure from accepted practices and structural designs had to be made and which was achieved by designing a prefabricated house requiring the very minimum of critical materials, yet economical, attractive, and capable of being erected and demounted in a few hours. Such construction including structural units designed for maximum utilization of wood material and adapted to be assembled in edge to edge relation, the meeting or contacting edges being formed to receive a cooperative removable locking plywood spline element, the simple moving into seating position of which effects the drawing together of said contacting edges into binding engagement and locking them in such position, and which forms the subject matter of this invention.

In the illustrated embodiment characterizing this invention there is shown building structural units or panels (A) and a unit or panel interconnecting and locking spline element (B).

Each of the structural units A, in the present instance, comprises side rails 1 and 2, end rails 3 and 4, and cross pieces 5. Said end rails and cross beams are adapted to bracingly interconnect the opposite rails 1 and 2 and with their contacting ends shaped and doweled, clampingly glued, or otherwise suitably secured to form a strong and rigid structure. The respective end rails 3 and 4 and the side rails 1 and 2 are formed centrally of their outer or contact surfaces with longitudinally extending grooves or recesses 6, and intersecting said grooves at predetermined points are the mortice openings 7 extending through said rails at right angles to the grooves for a purpose hereinafter more fully appearing.

The spline element B is constructed of plywood as shown in Fig. 4, which not only affords a strong, light weight locking element, but effects a conservation of critical materials as well. Said spline B comprises a key stem or body portion 8 of a length substantially corresponding to that of the particular rails or the like it is intended to lock, and of a width substantially twice the depth of the respective grooves 6 in which it is adapted to seat. Said body portion 8 is formed at one or more predetermined points throughout its length with a double lock tongue C adapted to extend through the registering openings 7 of the rails 1 and 2 or other contact elements when the parts are operatively assembled. Said locking tongue C comprises the integral inverted L-shaped tongue members 9 extending outwardly and downwardly from diametrically opposite sides of the body portion 8 and formed with beveled or cam contact surfaces 10 adapted, when said members 9 are projected through the registering openings 7 (Fig. 2), to engage the complemental beveled surfaces 11 formed in the outer surfaces of the rails 1 and 2 and extending downwardly and outwardly from the bottom of said openings 7, and to draw the said members 1 and 2 into binding engagement as tongue element C is moved into locking position, as clearly shown in Figs. 1 and 3. The openings 7 and tongue C are of corresponding size so that said tongue may be readily inserted and removed therefrom as desired. Also, the complemental bevel or cam surfaces 11 while rendering it somewhat easier to force the parts into binding and locking engagement, may, if desired, be omitted without departing from the scope or spirit of the invention.

In certain instances a single tongue spline may be used to better advantage than the double tongue spline, therefore, Fig. 6 illustrates a modified or single locking tongue spline member which is entirely similar to spline B, except that it has the locking tongue members 9 only on one side of the body portion 8.

Figs. 7, 8, and 9 illustrate a slightly modified form and are similar to the form shown in Figs. 1, 2, and 3 except embodying a stronger construction. In this form there is shown the structural units A comprising side rails 1ª and 2ª, and end rails 3ª, said rails being formed with grooves 6ª and mortice openings 7ª similar to the form heretofore described. Also, the plywood spline element Bª comprising body portion 8ª and the integral double lock tongue Cª with tongue members 9ª formed with the beveled or cam contact surfaces 10ª, is similar to the form heretofore described.

In this form the rails 1ª and 2ª are formed on their surfaces opposite to the grooves 6ª with a centrally disposed integral longitudinal rib or tongue 12 extending throughout the length of the rails and morticed through the end rails 3ª and 4ª (4ª not shown) as at 13. The cut off ends of tongues 12 at the bottoms of the mortice tongue receiving openings 7ª are beveled as at 14 adapted to engage the complemental beveled or cam surfaces 10ª when the rails 1ª and 2ª are brought into meeting engagement with the tongue Cª extending through the openings 7ª (Fig. 8), and as spline Bª is driven or forced in locking direction the tongue members 9ª engage the tongues 12 and force said rails 1ª and 2ª into binding and aligned engagement, as clearly shown in Fig. 9. In such position said tongue element Cª maintains the parts in binding and rigid association. It will thus be seen that the simple movement of the splines B or Bª into tightened position effects alignment and binding rigid engagement of the locked units.

To effect dismounting or disassociation of the locked units it is only necessary to drive the spline B or Bª in the opposite or unlocking direction until the tongue C or Cª is again in alignment with the registering openings 7 or 7ª, whereupon the units may be separated and removed as desired.

The illustration and description of the units A and Aª and the contacting rails are to be considered as descriptive and not as limitations, since the construction illustrated in connection with splines B and Bª are adapted to be used with equal facility in connection with various other types of construction units or elements to be interconnected and locked in rigid association, such as the meeting edges of floor, walls, ceiling and roof, etc.

It is thought the operation of the spline or locking element is sufficiently clear from the above description as to warrant further discussion unnecessary.

From the above it is apparent that I have designed a means of easily and quickly effecting the locking together of structural units including a simple locking spline element preferably, though not necessarily, constructed from plywood and constituting a weather seal at the jointure of the locked units, yet simple in construction, manufacturable at a minimum of cost, and efficient for the purposes intended.

Although in practice it has been found that the form of the invention illustrated in the accompanying drawings and referred to in the above description as the preferred embodiment is the most efficient and practical; yet realizing the conditions concurrent with the adoption of the invention will necessarily vary, I desire to emphasize that various minor changes in details of construction, proportion and arrangement of parts, may be resorted to within the scope of the appended claims without departing from or sacrificing any of the principles of the invention.

Having thus described my invention, what I desire protected by Letters Patent is as set forth in the following claims:

1. A pair of contacting members having their meeting faces longitudinally grooved and formed with openings intersecting said grooves, a spline element disposed in said grooves and having downwardly extending locking members adapted to project through said openings and into wedging engagement with the edges of said openings by the movement of said spline in locking direction to draw said contacting members into binding and locked engagement.

2. A building construction comprising a pair of demountable units having their opposed contacting surfaces formed with longitudinally extending grooves and openings intersecting said grooves, a spline element disposed in said grooves and having integral downwardly projecting wedge members extending from opposite sides and adapted to project through said openings into wedging engagement with the edges of said openings to draw said units into spline housing and binding locking engagement by the projecting movement of said spline in locking direction whereby said locked units present an uninterrupted smooth face surface.

3. The combination with a pair of structural contacting demountable members, said members being formed with longitudinally extending recesses and openings intersecting said grooves, the outer surfaces of said members being formed with inclined surfaces extending downwardly from said openings, a spline member disposed in said recesses and having downwardly projecting complementally inclined members adapted to project through said openings and into wedging engagement with the inclined surfaces of said members to draw said members into contacting binding engagement and retain said spline in locking position, said spline extending across the joint and forming a weather seal therefor.

4. The combination with a pair of demountable wooden structural contacting members, said members being formed with longitudinally extending recesses and with diametrically opposed openings, the outer surfaces of said members being formed with outwardly inclined surfaces in connection with said openings, an integral wooden spline member disposed in said recesses and having oppositely extending and downwardly projecting tongue members formed with complementally inclined surfaces adapted to extend into said opposed openings and into wedging engagement with said first mentioned inclined surfaces to draw said members into spline housing and binding engagement by the projecting movement of said spline in wedging direction and to maintain the latter in locking position, said spline extending throughout the length of said members and forming a seal for the jointure thereof.

5. The combination with a pair of demountable structural contacting members, said members being formed with thickened portions on their outer surfaces, with longitudinally extending recesses in their contacting surfaces, and with diametrically opposed openings extending through said members, said thickened portions being formed with inclined surfaces extending outwardly from said openings, a spline member disposed in said recesses having oppositely extending and downwardly projecting complementally inclined members adapted to project through said opposed openings and into wedging engagement with said first mentioned inclined surfaces to draw said members into contacting binding engagement and frictionally retain said spline in locking position, said spline being completely concealed in said recesses and extending across the joint and forming a weather seal therefor.

6. The combination with a pair of structural contacting members one of said members being formed with a longitudinally extending groove and with an opening therethrough intersecting said groove, a spline member disposed in said groove adapted to be suitably connected to the opposed contacting member and having an outwardly and downwardly projecting wedge member adapted to project through said opening and in wedging engagement with the edge thereof by the movement of said spline in locking direction to draw said contacting members into binding engagement and retain said spline in locked position, said spline member when in locking position extending across the joint and forming a weather seal therefor.

7. Means for effecting a positive and rigid interlocking of adjacent demountable structural units in assembled relation, said means comprising a spline element having a body portion, said portion being formed at spaced points within its length with oppositely extending outwardly and downwardly projecting tongue members formed adjacent their free ends with inclined surfaces, said spline adapted to seat in grooves formed in the meeting surfaces of said structural units with its tongues, respectively, extending in openings intersecting said grooves and with said inclined surfaces engaging the outer bottom edges of said openings, whereby movement of said spline in locking direction draws said units into binding and interlocking engagement and constitutes a weather seal.

8. A pair of contacting members having their meeting faces longitudinally grooved and formed with openings intersecting said grooves, a spline element disposed in said grooves and having means engageable in said openings adapted by the movement of said spline in locking direction to draw said contacting members into binding and locking engagement.

WALTER J. MULLIGAN.